United States Patent Office 3,501,506
Patented Mar. 17, 1970

3,501,506
2-MERCAPTO-3-METHOXYESTRA-1,3,5(10)-TRIEN-17β-OL AND CONGENERS
James R. Deason, Skokie, Ill., assignor to G. D. Searle & Co., Chicago, Ill., a corporation of Delaware
No Drawing. Filed Jan. 2, 1969, Ser. No. 788,610
Int. Cl. C07c 169/08
U.S. Cl. 260—397.4                    10 Claims

ABSTRACT OF THE DISCLOSURE

Preparation of 17-oxygenated 3-alkoxy-2-thia-estra-1,3,5(10)-trienes having valuable biological properties including estrogenic, antiinflammatory, and antihypercholesterolemic activity is disclosed.

---

This invention relates to 3-alkoxy-2-mercapto-estra-1,3,5(10)-trien-17β-ol and congeners, and to processes for the preparation thereof. More particularly, this invention provides new, useful, and unobvious chemical compounds of the formula

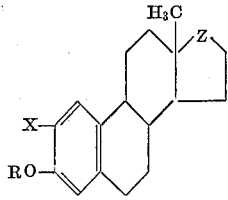

wherein R represents alkyl; X represents mercapto, alkylthio, alkylsulfinyl, alkylsulfonyl, or acylthio; and Z represents β-hydroxymethylene, β-acyloxymethylene, or carbonyl.

Among the alkyl groupings called for above, lower alkyls are preferred, which is to say methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain, hydrocarbon groupings of empirical formula $$-C_nH_{2n+1}$$

wherein $n$ represents a positive integer less than 8. The acyl groupings comprehended are preferably lower alkanoyl (i.e., lower alkyl —CO—), benzoyl, halogenated benzoyl (wherein the halogen can be situate ortho, meta, or para with respect to attachment of the benzene nucleus to oxygen and/or sulfur, ad libitum), etc.

The compounds to which this invention relates are useful by reason of their valuable biological properties. Thus, for example, they are estrogenic, antiinflammatory, and antihypercholesterolemic.

The estrogenic utility of the instant compounds is evident from the results of a standardized test for their capacity to increase uterine weight in immature mice. Procedure is substantially the same as that described by Edgren, Proc. Soc. Exp. Biol. Med., 92, 569 (1956). White, female, 21-day old mice maintained on a synthetic, estrogen-free diet are used as test animals. To each of a group of 6–10 such animals, test compound, dissolved or suspended in corn oil, is administered subcutaneously or buccally on each of 3 successive days. Commonly, the initial total dose is 1 mg. of compound in 0.1 ml. of corn oil administered subcutaneously in 3 equal portions. A second group of 6–10 animals likewise and concurrently administered corn oil alone serves as controls. The day after treatment is concluded, the animals are sacrificed; and the uteri are excised, dissected free of extraneous tissue, blotted to express contained fluid, and individually weighed. A compound is considered active if the mean uterine weight of the animals treated therewith significantly ($P \leq 0.01$) exceeds the mean uterine weight of the controls. Typical of compounds which produce the described estrogenic response at a dose of 1 mg., administered subcutaneously, are the products of Examples 1B, 4, and 9 hereinafter.

The antiinflammatory utility of the instant compounds is evident from the results of a standardized test for their capacity to inhibit the edema induced in rats by injection of carrageenin. The procedure is a modification of one described by Winter et al., Proc. Soc. Exp. Biol. Med., 111, 544 (1962). Compound is administered subcutaneously or intragastrically, dissolved or suspended in 0.5 ml. of aqueous 0.86% sodium chloride, propylene glycol, a mixture of these vehicles, or corn oil, to each of 10 male rats weighing 100–130 gm. A like group of rats to which is identically and concurrently administered vehicle alone serves as controls. Precisely 1 hour later, each animal is injected under the plantar surface of each hind foot with 0.1 ml. of an aqueous 1% solution of carrageenin (Marine Colloids, Inc., Type 402). A compound is considered antiinflammatory if the average total circumference (T) of the two hind feet in the group treated therewith, which is measured in arbitrary units 5 hr. after the carrageenin injection, is significantly ($P \leq 0.05$) less than the corresponding value (C) for the control group. Typical of compounds which produce the described antiinflammatory response at a dose of 25 mg., administered subcutaneously, are the products of Examples 9 and 11 hereinafter.

Further evidence of the antiinflammatory utility of the instant compounds is provided by the results of a standardized test for their capacity to inhibit the formation of granuloma tissue induced in adrenalectomized rats by implanted cotton. The procedure is a modification of one described by Dulin in Proc. Soc. Exp. Biol. Med., 90 115 (1955). Male Sprague-Dawley rats weighing 180–220 gm. are adrenalectomized, and their drinking water is thereafter replaced by aqueous 0.86% sodium chloride supplemented during the first 24 hours by glucose q.s. 5%. On the day after the adrenalectomy, 4 pellets of dental cotton weighing 5–7 mg. apiece are separately, subcutaneously, and bilaterally implanted in the pectoral and dorsal lateral neck region of each animal, whereupon the prescribed dose (initially, 20 mg. intragastrically) of compound to be tested, dissolved or suspended in a vehicle consisting of 0.5 ml. of either corn oil or a mixture of 20 ml. of aqueous 0.86% saline with 1 drop of polysorbate 80, is administered intragastrically or subcutaneously to each of 3–6 animals. A like group of animals to which is identically and concurrently administered vehicle alone serves as controls. This treatment is repeated the next day. The day after that the animals are sacrificed; and the pellets, with associated granuloma tissue, are dissected, dried, and weighed. A compound is considered antiinflammatory if the mean weight of granuloma tissue in the group of animals treated therewith, adjusted to compensate for variations in dissection technique, is significantly ($P \leq 0.05$) less than the corresponding weight in the control group. Typical of compounds which produce the described antiinflammatory response at a dose of 25 mg., administered subcutaneously, are the products of Examples 9 and 11 hereinafter.

The antihypercholesterolemic utility of the instant compounds is evident from the results of a standardized test for their capacity to counteract the increased serum cholesterol induced in rats by ingestion of propylthiouracil. A group of 8 male rats each weighing 220–250 gm. is used for each compound tested, propylthiouracil being administered by maintaining a concentration of 0.02% in the animals' drinking water throughout a 10-day period. Daily during that time, the selected dose of compound is dissolved or suspended in water or aqueous ≯30% propylene glycol and administered orally or subcutaneously to each animal. A corresponding group of 8 rats each concurrently and likewise receiving propylthiouracil and water or aqueous ≯30% propylene glycol but no compound serves as controls. On the 10th day, the surviving animals are anesthetized and blood samples are taken from the abdominal aortas and analyzed for cholesterol. A compound is considered antihypercholesterolemic if the cholesterol levels in animals treated therewith are significantly ($P<0.05$ as determined by the Wilcoxon Rank Sum method) lower than the corresponding control levels. Typical of compounds which produce the described antihypercholesterolemic response at a dose of 10 mg. per kg., administered intragastrically, are the products of Examples 1B and 2C hereinafter.

Those skilled in the art will recognize that observations of activity in standardized tests for particular biological effects are fundamental to the development of valuable new drugs, both veterinary and human.

Preparation of the subject compounds proceeds as follows: A 17β-acetoxy - 3 - alkoxy-2-chlorosulfonylestra-1,3,5(10)-triene, on contact with aluminum lithium hydride in tetrahydrofuran, affords the corresponding 3-alkoxy - 2 - mercaptoestra1,3,5(10)-trien-17β - ol. The mercapto group in the latter compound is protected by contacting with aqueous hydrogen peroxide and potassium hydroxide in methanol, affording the disulfide

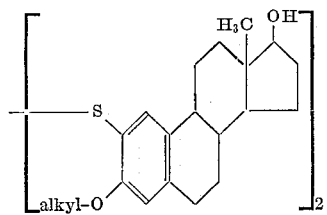

The hydroxyl therein is esterified by heating the disulfide with an acid anhydride, such as acetic anhydride, or halide, such as benzoyl chloride, in pyridine, whereupon contacting with triethylphosphine and water in a mixture of benzene and methanol cleaves the disulfide linkage and affords the corresponding 17β - acyloxy-3-alkoxy-2-mercaptoestra-1,3,5(10) - triene. Alternatively, the hydroxyl aforesaid is oxidized with chromium trioxide in acetone, whereupon cleavage with triethylphosphine and water affords the 3-alkoxy-2 - mercaptoestra-1,3,5(10)-trien-17-one. The mercaptans of this invention are converted to the corresponding alkylthio compounds by heating with an alkyl iodide and sodium methoxide in methanol; and the alkylthio compounds are oxidized to sulfoxides by contacting with m-chloroperbenzoic acid in chloroform. Alternatively, the alkylthio compounds are oxidized to sulfones by heating with hydrogen peroxide in acetic acid. Esterification of any mercapto or hydroxy group present is effected by heating with an acid anhydride or halide as outlined above.

The following examples described in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are referred to the D line of sodium.

EXAMPLE 1

(A) 17β-acetoxy-2-chlorosulfonyl-3-methoxyestra-1,3,5(10)-triene

Approximately 335 parts of chloroform is washed with water and dried over anhydrous sodium sulfate, whereupon 45 parts of 17β-acetoxy-3-methoxyestra-1,3,5(10)-triene is dissolved therein. The resultant solution is maintained at about 10° with moderate stirring while 315 parts of chlorosulfonic acid is introduced during 70 minutes. The solution thus obtained is cautiously poured into 3 volumes of ice-and-water. The resultant mixture is extracted with carbon tetrachloride. The extract is dried over anhydrous sodium sulfate, whereupon the solvent is removed by vacuum distillation and the residue then recrystalized from a mixture of benzene and petroleum ether. The crystalline product is 17β-acetoxy-2-chlorosulfonyl-3-methoxyestra-1,3,5(10) - triene melting at 196–199°.

(B) 2-mercapto-3-methoxyestra-1,3,5(10 -trien-17β-ol

To a slurry of 25 parts of aluminum lithium hydride in 180 parts of tetrahydrofuran is added, with stirring during 1¼ hours at room temperatures, a solution of 50 parts of 17β-acetoxy-2-chlorosulfonyl-3-methoxy-estra-1,3,5(10)-triene in 720 parts of tetrahydrofuran. The resultant mixture is heated at the boiling point under reflux for 7 hours, then allowed to stand at room temperatures overnight. Excess reducing agent is thereupon destroyed by consecutive addition of 45 parts of ethyl acetate and 50 parts of water. The mixture thus obtained is partitioned between 10% hydrochloric acid and ether. The ether phase is separated; consecutively washed with water, aqueous 5% sodium bicarbonate, and water; dried over anhydrous magnesium sulfate; and stripped of solvent by vacuum distillation. Recrystallization of the residue from methanol affords 2-mercapto-3-methoxyestra-1,3,5(10)-trien-17β-ol melting at 179–182°, and further characterized by a specific rotation of +101.5° (1% in chloroform). The product has the formula

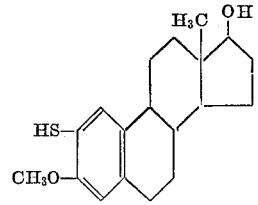

EXAMPLE 2

(A) Bis[17β-hydroxy-3-methoxyestra-1,3,5(10)-trien-2-yl] disulfide

To a solution of 96 parts of 2-mercapto-3-methoxyestra-1,3,5(10)-trien-17β-ol and 20 parts of potassium hydoxide in 8000 parts of methanol is added 28 parts of aqueous 30% hydrogen peroxide. The precipitate which forms is filtered off after 5 minutes at room temperature, washed with water, and recrystallized from methanol to give bis [17β-hydroxy-3-methoxyestra-1,3,5(10)-trien - 2 - yl] disulfide melting at approximately 193°–194° and further characterized by a specific rotation of +100.3° (1% in chloroform).

(B) Bis[17β-acetoxy-3-methoxyestra-1,3,5(10)-trien-2-yl] disulfide

A mixture of 127 parts of bis[17β-hydroxy-3-methoxyestra-1,3,5(10)-trien-2-yl] disulfide, 600 parts of acetic anhydride, and 600 parts of pyridine is heated at 90–95° for ¾ hour and then poured into 10 volumes of ice-and-water. The precipitate which forms is filtered off, washed with water, and recrystallized from a mixture of benzene and methanol to give bis [17β-acetoxy-3-methoxy-estra-1,3,5(10)-trien-2-yl] disulfide melting at 227–229° and further characterized by a specific rotation of +81° (1% in chloroform).

(C) 17β-Acetoxy-3-methoxyestra-1,3,5(10)-triene-2-thiol

A solution of 615 parts of bis [17β-acetoxy-3-methoxyestra-1,3,5(10)-trien-2-yl] disulfide and 200 parts of triethylphosphine in a mixture of 8100 parts of benzene, 8100 parts of methanol, and 900 parts of water is stirred at room temperatures. Crystals begin to separate within a few minutes. After 1 hour, stirring is discontinued, and the crystals filtered off, washed with methanol, dried in air, and recrystallized from a mixture of benzene and acetone to give 17β-acetoxy-3-methoxyestra-1,3,5(10)-triene-2-thiol melting at 195–200° and further characterized by a specific rotation of +60° (1% in chloroform). The product has the formula

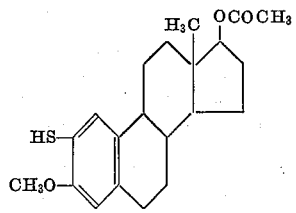

EXAMPLE 3

(A) Bis[3-methoxy-17-oxoestra-1,3,5(10)-trien-2-yl] disulfide

To a solution of 6 parts of chromium trioxide in 12 parts of water is added 9 parts of concentrated sulfuric acid followed by 12 parts of water. The resultant solution is added to a mixture of approximately 19 parts of bis [17β-hydroxy-3-methoxyestra-1,3,5(10)-trien-2-yl] disulfide and 720 parts of acetone. To the mixture thus obtained is added 1 part of methanol. Insoluble solids are filtered out and washed with acetone. Filtrate and wash are combined and diluted with an equal volume of ice water. The precipitate which forms is filtered off, washed with water, dried in air, and recrystallized from a mixture of methanol and chloroform to give bis[3-methoxy-17-oxoestra-1,3,5(10)-trien-2-yl] disulfide melting at 223–228° (with decomposition). Recrystallization from acetone affords the same compound in another crystalline modification melting at 174–176° and further characterized by a specific rotation of +205° (1% in chloroform).

(B) 2-Mercapto-3-methoxyestra-1,3,5(10)-trien-17-one

To a solution of 20 parts of bis[3-methoxy-17-oxoestra-1,3,5(10)-trien-2-yl] disulfide in 450 parts of benzene is added 11 parts of triethylphosphine, 400 parts of methanol, and 50 parts of water. The resultant solution is heated for 1½ hours at 85–95°, then stripped of solvent by vacuum distillation. The residue, recrystallized from methanol, affords 2-mercapto-3-methoxyestra-1,3,5(10)-trien-17-one melting at 178–180° and further characterized by a specific rotation of +158° (1% in chloroform). The product has the formula

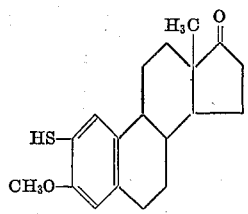

EXAMPLE 4

3-methoxy-2-methylthioestra-1,3,5(10)-trien-17β-ol

A mixture of 100 parts of 2-mercapto-3-methoxyestra-1,3,5(10)-trien-17β-ol, approximately 46 parts of methyl iodide, 20 parts of sodium methoxide, and 2,400 parts of methanol is heated at the boiling point under reflux for 1 hour, then diluted with 10 volumes of water. The solid precipitate is filtered off and recrystallized from aqueous methanol, then chromatographed on silica gel, using benzene and ethyl acetate as developing solvents. From eluates comprising 5% and 10% ethyl acetate in benzene, on evaporation of the solvents and recrystallization of the combined residues from methanol, 3-methoxy-2-methylthioestra-1,3,5(10)-trien-17β-ol melting at approximately 139–140° is obtained. The product has the formula

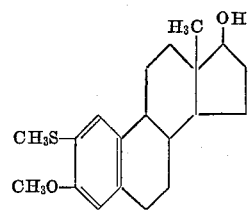

EXAMPLE 5

17β - acetoxy - 3 - methoxy-2-methylthioestra-1,3,5(10)-triene

A mixture of 1 part of 3-methoxy-2-methylthioestra-1,3,5(10)-trien-17β-ol, 5 parts of pyridine, and 5 parts of acetic anhydride is allowed to stand at room temperatures overnight, then poured into 10 volumes of water. The resultant mixture is extracted with ether. The ether extract is consecutively washed with 5% hydrochloric acid, water, aqueous 10% sodium bicarbonate, and water, then dried over magnesium sulfate and finally stripped of solvent by vacuum distillation. The residue is recrystallized from ethanol. The product thus isolated is 17β-acetoxy-3-methoxy-2-methylthioestra-1,3,5(10)-triene, having the formula

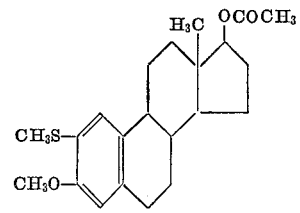

EXAMPLE 6

3-methoxy-2-methylthioestra-1,3,5(10)-trien-17-one

A mixture of 10 parts of 3-methoxy-2-mercaptoestra-1,3,5(10)-trien-17-one, approximately 2 parts of sodium methoxide, 2 parts of methyl iodide, and 400 parts of methanol is heated at the boiling point under reflux in an atmosphere of nitrogen for 1 hour, then filtered. The filtrate is concentrated by vacuum distillation to the point of incipient precipitation, then chilled. The precipitate which forms is filtered off and dried in air. The product thus isolated is 3-methoxy-2-methylthioestra-1,3,5(10)-trien-17-one, having the formula

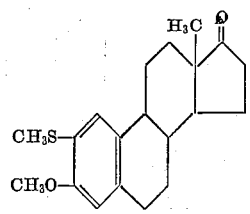

EXAMPLE 7

3-methoxy-2-methylsulfinylestra-1,3,5(10)-trien-17β-ol

To a solution of 7 parts of 3-methoxy-2-methylthioestra-1,3,5(10)-trien-17β-ol in approximately 150 parts of chloroform at around 10° is added, with stirring, a solution of 5 parts of 85% m-chloroperbenzoic acid in approximately 150 parts of chloroform. Stirring is continued at ambient temperatures for ½ hour, at which point the resultant solution is washed with aqueous 10% sodium bicarbonate, dried over anhydrous magnesium sulfate, and stripped of solvent by vacuum distillation. The residue is chromatographed on silica gel, using benzene and ethyl acetate as developing solvents. The product is isolated from an ethyl acetate eluate by distilling off the solvent and recrystallizing the residue from acetone. The 3-methoxy-2-methylsulfinylestra-1,3,5(10)-trien-17β-ol thus obtained melts in the range 204–225° (with decomposition). It has the formula

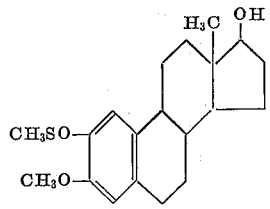

EXAMPLE 8

3-methoxy-2-methylsulfonylestra-1,3,5(10)-trien-17β-ol

A mixture of 76 parts of 3-methoxy-2-methylthioestra-1,3,5(10)-trien-17β-ol, 66 parts of 30% hydrogen peroxide, and 2000 parts of acetic acid is heated at around 90° for 1½ hours, then diluted with 5 volumes of water. The solid precipitate which forms is filtered off and consecutively recrystallized from aqueous acetone and methanol to give 3-methoxy-2-methylsulfonylestra-1,3,5(10)-trien-17β-ol melting at 251–253° (with decomposition) and further characterized by a specific rotation of +82°. The product has the formula

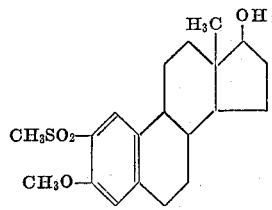

EXAMPLE 9

17β-acetoxy-2-acetylthio-3-methoxyestra-1,3,5(10)-triene

A mixture of 1 part of 2-mercapto-3-methoxyestra-1,3,5(10)-trien-17β-ol, 10 parts of acetic anhydride, and 10 parts of pyridine is allowed to stand at room temperatures overnight, then poured into 10 volumes of ice water. The precipitate which forms is isolated by filtration, dried in air, and recrystallized from methanol to give 17β-acetoxy-2-acetylthio-3-methoxyestra-1,3,5(10)-triene melting at approximately 109–110° and further characterized by a specific rotation of +52°. The product has the formula

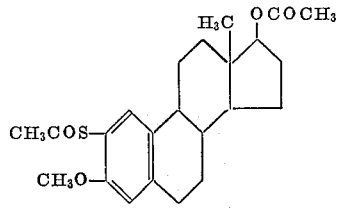

EXAMPLE 10

17β-acetoxy-2-benzoylthio-3-methoxyestra-1,3,5(10)-triene

A mixture of 10 parts of 17β-acetoxy-3-methoxyestra-1,3,5(10)-triene-2-thiol, 7 parts of benzoyl chloride, and 200 parts of pyridine is heated at 85–95° for 1 hour, then poured into 10 volumes of ice water. The precipitate which forms is filtered off, washed with water, dried in air, and recrystallized from methanol to give 17β-acetoxy-2 - benzoyl-thio-3-methoxyestra-1,3,5(10)-triene, having the formula

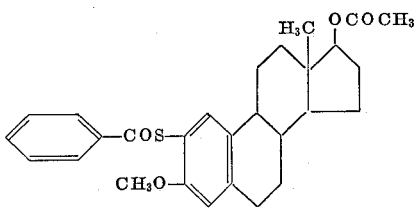

EXAMPLE 11

17β-acetoxy-2-(p-chlorobenzoylthio)-3-methoxy-estra-1,3,5(10)-triene

A mixture of 17 parts of 17β-acetoxy-3-methoxyestra-1,3,5(10)-triene-2-thiol, 10 parts of p-chlorobenzoyl chloride, and 250 parts of pyridine is heated at around 90° for 1 hour, then poured into 10 volumes of ice water. The precipitate which forms is isolated by filtration, washed with water, dried in air, and recrystallized from a mixture of chloroform and methanol to give 17β-acetoxy-2-(p-chlorobenzoylthio)-3 - methoxyestra-1,3,5(10)-triene melting at approximately 212–213° and further characterized by a specific rotation of +54°. The product has the formula

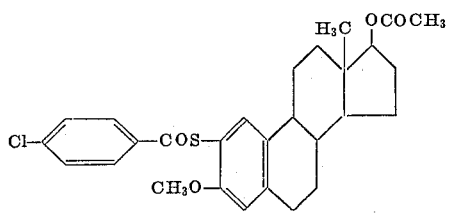

EXAMPLE 12

17β-benzoyloxy-2-benzoylthio-3-methoxyestra-1,3,5(10)-triene

A mixture of 18 parts of 2-mercapto-3-methoxyestra-1,3,5(10)-trien-17β-ol, 20 parts of benzoyl chloride, and 250 parts of pyridine is heated at around 90° for 1 hour, then poured into 10 volumes of ice water. A solid precipitate is formed. The precipitate is isolated by filtration, washed with water, dried in air, and recrystallized from methanol to give 17β-benzoyloxy-2-benzoylthio-3-methoxyestra-1,3,5(10)-triene, having the formula

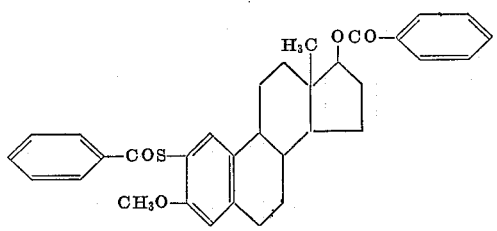

EXAMPLE 13

17β-(p-chlorobenzoyloxy)-2-(p-chlorobenzoylthio)-3-methoxyestra-1,3,5(10)-triene Substitution of 20 parts of p-chlorobenzoyl chloride for the benzoyl chloride called for in Example 12 affords, by the procedure there detailed, 17β-(p-chlorobenzoyloxy - 2 - (p - chlorobenzoylthio) - 3 - methoxyestra- 1,3,5(10)-triene melting at 130–135°. The product has the formula

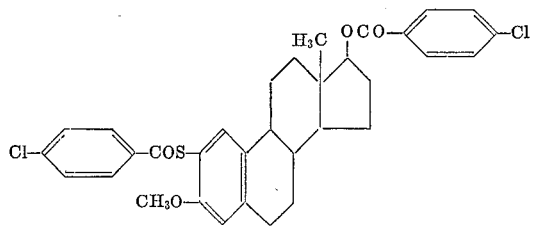

EXAMPLE 14

2-acetylthio-3-methoxyestra-1,3,5(10)-trien-17-one

A mixture of 55 parts of 3-methoxy-2-mercaptoestra-1,3,5(10)-trien-17-one, 200 parts of acetic anhydride, and 200 parts of pyridine is heated at 85–95° for 1 hour, then poured into 15 volumes of ice water. The solid precipitate which forms is filtered off, washed with water, dried in air, and recrystallized from methanol to give 2-acetylthio-3-methoxyestra-1,3,5(10)-trien-17-one melting at approximately 156–157° and further characterized by a specific rotation of +137°. The product has the formula

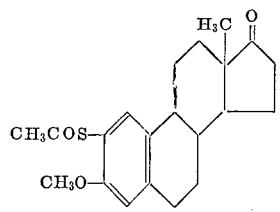

What is claimed is:
1. A compound of the formula

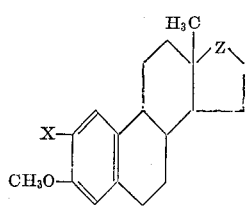

wherein X represents mercapto, (lower alkyl)thio, (lower alkyl) sulfinyl, (lower alkyl)sufonyl, (lower alkanoyl) thio, benzoylthio, or chlorobenzoylthio and Z represents β-hydroxymethylene, β-[(lower alkanoyl)oxy]methylene, β - (benzoyloxy)methylene, β - (chlorobenzoyloxy)methylene, or carbonyl.

2. A compound according to claim 1 having the formula

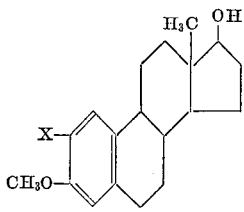

wherein X represents mercapto, (lower alkyl)thio, (lower alkyl)sulfinyl, or (lower alkyl)sulfonyl.

3. A compound according to claim 1 which is 2-mercapto-3-methoxyestra-1,3,5(10)-trien-17β-ol.
4. A compound according to claim 1 which is 3-methoxy-2-methylthioestra-1,3,5(10)-trien-17β-ol.
5. A compound according to claim 1 having the formula

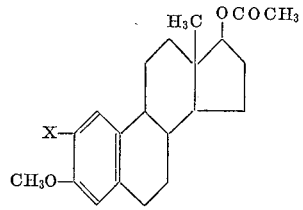

wherein X represents mercapto, (lower alkyl)thio, (lower alkanoyl)thio, benzoylthio, or chlorobenzoylthio.

6. A compound according to claim 1 which is 17β-acetoxy-2-acetylthio-3-methoxyestra-1,3,5(10)-triene.
7. A compound according to claim 1 having the formula

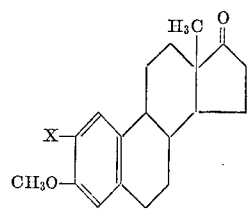

wherein X represents mercapto, (lower alkyl)thio, or (lower alkanoyl)thio.

8. A compound according to claim 1 which is 2-mercapto-3-methoxyestra-1,3,5(10)-trien-17-one.
9. A compound according to claim 1 in which 2-acetylthio-3-methoxyestra-1,3,5(10)-trien-17-one.
10. A compound of the formula

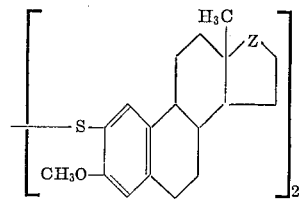

wherein Z represents β-hydroxymethylene, β-[(lower alkanoyl)-oxy]methylene, or carbonyl.

References Cited

Clarke, R.: Journ. Org. Chem., vol. 28, 1963, pp. 2626–2633.

Marks et al.: Zeitschrift Physiol. Chem., 349, 1208 (September 1968).

LEWIS GOTTS, Primary Examiner
E. G. LOVE, Assistant Examiner

U.S. Cl. X.R.
260—397.5; 424—238, 243